(12) United States Patent
Limatibul (10) Patent No.: US 11,691,791 B2
(45) Date of Patent: Jul. 4, 2023

(54) TUBULAR CONTAINER WITH INVISIBLE LONGITUDINAL OVERLAPPED SIDE SEAM

(71) Applicant: KIMPAI LAMITUBE CO., LTD., Bangkok (TH)

(72) Inventor: Sumet Limatibul, Bangkok (TH)

(73) Assignee: KIMPAI LAMITUBE CO., LTD., Bangkok (TH)

(*) Notice: Subject to any disclaimer, the term of this patent is extended or adjusted under 35 U.S.C. 154(b) by 823 days.

(21) Appl. No.: 16/348,057

(22) PCT Filed: Jul. 5, 2017

(86) PCT No.: PCT/TH2017/000053
§ 371 (c)(1),
(2) Date: May 7, 2019

(87) PCT Pub. No.: WO2018/186809
PCT Pub. Date: Oct. 11, 2018

(65) Prior Publication Data
US 2019/0299558 A1      Oct. 3, 2019

(30) Foreign Application Priority Data
Apr. 5, 2017  (TH) .............................. 1701001920

(51) Int. Cl.
*B65D 35/08*    (2006.01)
*B32B 1/08*     (2006.01)
(Continued)

(52) U.S. Cl.
CPC ............... *B65D 35/08* (2013.01); *B32B 1/08* (2013.01); *B32B 15/20* (2013.01); *B32B 27/06* (2013.01);
(Continued)

(58) Field of Classification Search
CPC .. B32B 1/02; B32B 1/08; B32B 1/306; B32B 1/32; B32B 1/327; B32B 1/34;
(Continued)

(56) References Cited

U.S. PATENT DOCUMENTS

| | | | |
|---|---|---|---|
| 4,685,591 A | * | 8/1987 | Schaefer ............... B32B 15/082 |
| | | | 222/215 |
| 4,733,800 A | | 3/1988 | Björkengren et al. |

(Continued)

FOREIGN PATENT DOCUMENTS

| | | |
|---|---|---|
| CN | 101415537 A | 4/2009 |
| EP | 0 187 541 A2 | 7/1985 |

(Continued)

OTHER PUBLICATIONS

International Search Report (ISR) and Written Opinion (WO) dated May 22, 2018 for Application No. PCT/TH2017/000053.

(Continued)

*Primary Examiner* — Walter Aughenbaugh
(74) *Attorney, Agent, or Firm* — Ladas & Parry LLP (57) ABSTRACT

A laminate tube with an invisible longitudinal overlapped side seam formed from overlap welding an edge of one margin of a laminate sheet comprising an outer plastic layer (A), a barrier layer (B), and an inner plastic layer (C) of the same material type as the outer plastic layer (A) to the other edge of the opposite margin of the laminate sheet, such that an inner surface of the laminate tube has a hump in a overlapped region, while an outer surface of the laminate tube is smooth without a hump in the overlapped region; and a process for manufacturing the laminate tube by a laminate tube manufacturing machine. The laminate permits fracture-proof welding of longitudinal margins of said laminate to (Continued)

give a continuous tube which is suitable for manufacturing of high-quality plastic tubes, high-quality plastic bags and the like.

9 Claims, 4 Drawing Sheets

(51) Int. Cl.
  *B32B 15/20* (2006.01)
  *B32B 27/06* (2006.01)
  *B65D 35/02* (2006.01)
  *B32B 27/28* (2006.01)

(52) U.S. Cl.
  CPC ............ B65D 35/02 (2013.01); *B32B 27/285* (2013.01); *B32B 2439/40* (2013.01)

(58) Field of Classification Search
  CPC ..... B32B 1/36; B32B 27/285; B32B 2439/40; B32B 15/08; B32B 15/085; B32B 15/088; B32B 15/09; B32B 15/20; B65D 35/00; B65D 35/02; B65D 35/04; B65D 35/06; B65D 35/08; B65D 35/10; B65D 35/14; B65D 35/16
  See application file for complete search history.

(56) References Cited

U.S. PATENT DOCUMENTS

| | | |
|---|---|---|
| 2006/0266728 A1 | 11/2006 | Wilkes |
| 2010/0000674 A1 | 1/2010 | Voigtmann |
| 2010/0243094 A1 | 9/2010 | Arz |
| 2016/0093840 A1* | 3/2016 | Yoshino ................ B32B 27/34 429/176 |

FOREIGN PATENT DOCUMENTS

| | | |
|---|---|---|
| JP | 8-104340 A | 4/1996 |
| JP | 2016-74451 A | 5/2016 |
| WO | 2007/113780 A2 | 10/2007 |
| WO | 2007/113782 A2 | 10/2007 |
| WO | 2007/113783 A1 | 10/2007 |
| WO | 2011/083499 A2 | 7/2011 |
| WO | 2013/051008 A2 | 4/2013 |
| WO | 2016/109963 A1 | 7/2016 |

OTHER PUBLICATIONS

Espacenet English abstract of JP 8-104340 A.
Espacenet English abstract of CN 101415537 A.
Espacenet English abstract of JP 2016-74451 A.
Espacenet English abstract of WO 2007/113780 A2.
Espacenet English abstract of WO 2007/113782 A2.
Espacenet English abstract of WO 2007/113783 A1.

* cited by examiner

Side seam gap    0mm    1mm    2mm

TUBULAR CONTAINER WITH INVISIBLE LONGITUDINAL OVERLAPPED SIDE SEAM

RELATED APPLICATION

This application is an application under 35 U.S.C. 371 of International Application No. PCT/TH2017/000053 filed on Jul. 5, 2017, the entire contents of which are incorporated herein by reference.

FIELD OF THE INVENTION

The present invention is in the field of materials science and relates to a tubular container with an invisible longitudinal overlapped side seam.

BACKGROUND OF THE INVENTION

Conventional side seams of tubular are comprised of two types of welding which are butt welding and overlap welding. The edges of whose opposite laminate margins were butt or overlap welded to each other. In a case of the butt welding, the seam is secured between an outer printed film and an inner support film across the films. The butt welding between the outer printed film and the inner support film occurs, even if there is a height shift between the opposite laminate edges, good optical properties together with a low-stress shaped tube product is obtained. In order to achieve a further increase in the stability of the weld seam, it is preferable that the laminate margins were cut obliquely at an angle of 30° to 90° with the respect to a plane of the laminate, and welded.

U.S. Pat. No. 4,733,800 discloses a device and a method for manufacturing of a packaging tube. A tube body formed from a laminate comprising a metal foil and a plastic layer is provided with a strip. The strip is also formed from a laminate incorporating a metal foil and a plastic film. The metal foil in the strip is thicker than the metal foil in the body laminate. The strip provides dead-fold characteristics. The strip may extend along a joint, such as a butt joint, in the tube body, so that the strip covers the joint. The strip is arranged on the inside of the tube body and has such a width that on both sides of a longitudinal tube body joint there is formed a barrier against penetration into the longitudinal joint of substances of the filling goods having delaminating characteristics. The laminate of the strip includes a metal foil and at least one layer of plastic material.

EP publication number 0187541 A discloses a packaging tube with the use of a special multiple-layer sheet for a tube sidewall and a covering strip over an inner surface of a longitudinal side seam of the tube. The covering strip is high density polyethylene, and it covers and protects edges of the sheet material on the inside of the package at the longitudinal side seam of the tube.

Patent application number PCT/IB2007/051247 discloses a packaging made from a thermoplastic film whose ends are placed so that they are abutted, wherein said film comprises several layers including at least a first weldable layer and a second layer whose the butt-welding is only partial or non-existent, and at least one thin strip covering said ends and being directly attached to one of the surfaces of the second layer, the melting-point difference between the first layer and the other layer(s) being greater than 20° C.

Patent application number PCT/IB2007/051249 discloses a tubular packaging body formed from a laminate composed of at least one thermoplastic material whose ends are sealed and covered with a sealed or bonded strip. The tubular body is characterized in that said strip is at least partially embedded in the laminate. The strip is completely embedded in the laminate, so that the assembled surface forms a smooth and continuous surface.

Patent application number PCT/IB2007/051250 discloses a plastic tubular package comprising a head assembled on a tubular body consisting of a laminate whose ends are mutually sealed and covered with a strip, said laminate comprising at least one sealing layer and one non-sealing layer. The invention is characterized in that the strip comprises a bi-oriented polymer and a layer enabling the strip to be fixed on the laminate, the tensile rigidity of the strip being further not less than the rigidity of the non-sealing layer.

Patent publication number US2010/0000674A1 discloses a process for manufacturing a plastic packaging in a tubular form, wherein the process comprises a wrapping step during which a laminate is wrapped, an abutting step during which edges of the laminate are abutted together, and a fastening step during which said edges of the laminate are welded together, characterized in that a plastic bead in a molten state is extruded and deposited on the inner surface of the packaging so as to cover at least a welded zone defined between the edges. The energy needed to produce the weld comes from the plastic bead. A complex high-frequency welding system is no longer necessary, the energy needed to produce the weld comes from the plastic bead. The external appearance of the tube is perfect, given that the energy for producing the weld is applied from the inside. Substantially, a covering layer is made of PE or PP inside the tube along the joint between the two edges of the laminate, preventing any contact between the product contained in the tube and the aluminium barrier layer of the laminate.

The other type of the side seam of the laminate tube is the overlap welding. The overlapped side seam of the tube is formed by sealing the inner film of one laminate margin with the outer printed film of the other laminate margin. The two materials should be produced from the same type of plastic, since otherwise it would not be possible to form the sealed seam. In principle, the welded seams can be extended at an angle of 90° with respect to the plane of the laminate.

Patent publication number US2010/0243094A1 discloses a polymer film laminate, which can be heat-sealed in order to form a tubular packaging, in particular a tube, and which comprises at least one outer self-sealing printed film consisting of an HDPE-based material and an inner self-sealing polymeric support film which is connected to the printed film and whose melting point is identical to or a maximum 200° C. less than that of the printed film. The edges of the tube can be abutted or overlapped in order to form the tube seam. If the seam edges are abutted and formed a height misalignment between the opposite seam edges, the support film of one edge bonds to the printed film of the opposite edge, so that a highly-stable seam can be maintained even under said conditions. High frequency welding with independent internal and external generators is used by means of ultrasound, laser, thermal and adhesive methods. In order to achieve a further increase in the stability of the welded seam, it is preferable that the laminate margins are cut obliquely at an angle of 30° to 90°, preferably from 40° to 60°, with the respect to the plane of the laminate, and welded.

Patent application number PCT/IN2011/000015 discloses a laminate and a sealing strip for manufacturing a flexible laminate tube. The laminate includes at least two layers, an outer layer and an inner layer. The outer layer and the inner layer are non-sealable to each other and sealable to itself. The laminate is folded in order to overlap two longitudinally-extending opposite edges thereof to configure a hollow body member. The sealing strip includes at least two layers, a first layer and a second layer. The first layer is sealable to the inner layer of the laminate, and the second layer is sealable to the outer layer of the laminate. The sealing strip is configured in-between two longitudinally-extending opposite overlapped edges of the laminate such that the first layer faces the inner layer, and the second layer faces the outer layer in order to seal the two longitudinally-extending opposite edges for configuring the hollow body member for making the tube. Protective strips are sealed longitudinally with the inner surface or both inner and outer surfaces of the tube for covering the laminate edge. The tube is capable of being effectively sealed and avoids delamination and blurring or hazing of the imprinted information.

Patent application number PCT/IN12/00391 discloses a laminate with an invisible seam. The laminate is formed by fusing an inner layer of said multilayer laminate along longitudinal ends of the laminate by heating at a high pressure to form a butt joint, and an outer layer of the laminate is not used in fusing with the substantially-invisible seam.

SUMMARY OF THE INVENTION

The present invention generally relates to a tube body made from a flexible multi-layered sheet with an invisible longitudinal overlapped side seam and a process for preparing said tube. These tubes are used as containers, tubes and the like for packaging and dispensing paste, gel and cream types of products. The present invention also relates to a packaging tube comprising the body formed from a laminate sheet comprising a barrier film and plastic layers. The tube body is formed by welding two side edges of the laminate sheet.

DETAILED DESCRIPTION

The present invention is directed to an improvement of a side seam of a laminate tube. The invention relates to a heat-sealable plastic film laminate for manufacturing a tubular package. The laminate permits fracture-proof welding of longitudinal margins of said laminate to give a continuous tube which is suitable for manufacturing of a high-quality plastic tubes, a high-quality plastic bags and the like.

In one embodiment, this invention provides a laminate tube with an invisible longitudinal overlapped side seam formed from overlap welding an edge of one margin of a laminate sheet comprising an outer plastic layer, a barrier layer, and an inner plastic layer of the same material type as the outer plastic layer to the other edge of the opposite margin of the laminate sheet, such that an inner surface of the laminate tube has a hump in an overlapped region, while an outer surface of the laminate tube is smooth without a hump in the overlapped region.

The edges of both margins of the laminate sheet may be cut obliquely at a predetermined angle of approximately 30° to 90°, preferably from 45° to 60°, before welding.

The outer plastic layer and the inner plastic layer may be a mono-layered plastic or multi-layered plastics. The outer plastic layer and the inner plastic layer may have a thickness of 50-300 microns. The outer plastic layer and the inner plastic layer may be selected from the group consisting of polyethylene, copolymers of ethylene and alpha-olefin, polypropylene, polypropylene-based elastomers, copolymers of propylene and alpha-olefin, copolymers of ethylene and propylene, copolymers of ethylene and cyclic acid, and ethylene acid copolymers.

The barrier layer may be selected from the group consisting of an aluminium foil, PET (a polyester film) (a polyethylene terephthalate film), mPET (a metallized polyester film), EVOH (copolymers of ethylene and vinyl alcohol), and PE (polyethylene). The barrier layer has a thickness of 7-30 microns.

The laminate sheet for manufacturing the laminate tube with the invisible longitudinal overlapped side seam may be a laminate sheet with a matt or glossy printed surface.

In one embodiment, this invention provides a process for manufacturing a laminate tube with an invisible longitudinal overlapped side seam, wherein there is a hump in an overlapped region on an inner surface of the laminate tube, while there is no said hump on an outer surface of the laminate tube, by a laminate tube manufacturing machine, this process comprising: disposing a laminate sheet comprising an outer plastic layer, a barrier layer, and an inner plastic layer of the same material type as the outer plastic layer into a welding zone, wherein edges of both margins of the laminate sheet are cut obliquely at a predetermined angle of more than or equal to 30° and less than 90°, and wherein one obliquely-cut edge of one margin is overlapped correspondingly to the other obliquely-cut edge of the opposite margin of the laminate sheet, before welding;

welding said obliquely-cut edges of both margin of the laminate sheet in the welding zone by an overlap welding means adjusted in the lengths of contact belts heated by energy sources to be less than or equal to 20 mm in order to overlap-weld the edges of both margin of said laminate sheet by the heat energy sources under pressure; and cooling the overlapped side seam rapidly in a cooling zone at a temperature of less than or equal to 15° C.

In said process, the edges of both margins of the laminate sheet are cut obliquely at a predetermined angle of 45° to 60°.

In said process, the outer plastic layer and the inner plastic layer may be a mono-layered plastic or multi-layered plastics. The outer plastic layer and the inner plastic layer may have a thickness of 50-300 microns.

In said process, the outer plastic layer and the inner plastic layer may be selected from the group consisting of polyethylene, copolymers of ethylene and alpha-olefin, polypropylene, polypropylene-based elastomers, copolymers of propylene and alpha-olefin, copolymers of ethylene and propylene, copolymers of ethylene and cyclic acid, and ethylene acid copolymers.

In said process, the barrier layer may be selected from the group consisting of an aluminium foil, PET (a polyester film) (a polyethylene terephthalate film), mPET (a metallized polyester film), EVOH (copolymers of ethylene and vinyl alcohol), and PE (polyethylene). The barrier layer has a thickness of 7-30 microns.

In said process, the laminate sheet for manufacturing the laminate tube with the invisible longitudinal overlapped side seam may be a laminate sheet with a matt or glossy printed surface.

In said process, the overlap welding means is adjusted in the lengths of the contact belts having the heat sources to be less than 10 mm.

In said process, the tube with the overlapped side seam is further cooled rapidly at a temperature of 10-15° C. By this way, the laminate sheet for manufacturing the laminate tube with the invisible longitudinal overlapped side seam is achieved.

In one embodiment, this invention provides a process for manufacturing a laminate tube with an invisible longitudinal overlapped side seam by a laminate tube manufacturing machine, this process comprising:

disposing a laminate sheet comprising an outer plastic layer, a barrier layer, and an inner plastic layer of the same material type as the outer plastic layer into a welding zone, wherein edges of both margins of the laminate sheet are cut obliquely at a predetermined angle of 45° to 60°, and wherein one obliquely-cut edge of one margin is overlapped correspondingly to the other obliquely-cut edge of the opposite margin of the laminate sheet, before welding;

welding said obliquely-cut edges of both margin of the laminate sheet in the welding zone by an overlap welding means adjusted in the lengths of contact belts heated by energy sources to be less than or equal to 10 mm in order to overlap-weld the edges of both margin of said laminate sheet by the heat energy sources under pressure; and cooling the overlapped side seam rapidly in a cooling zone at a temperature of 10-15° C.

In one embodiment, this invention relates to an apparatus for manufacturing a laminate tube body with an invisible longitudinal overlapped side seam comprising: a welding zone, wherein the welding zone has a first energy source and a second energy source located oppositely to each other and incorporated with a first contact belt and a second contact belt respectively, wherein the edges of the margins of the laminate sheet is fused between said two contact belts heated by both energy sources, and wherein the lengths of both contact belts are less than or equal to 20 mm; a cooling zone, wherein the cooling zone is formed by a chilled beam for cooling the laminate tube rapidly at a temperature of less than or equal to 15° C.; and a cutting means located downstream for cutting the tube body according to the desired length.

In one embodiment, this invention relates to a welding device for manufacturing a tube body by welding two edges of opposite margins of a laminate sheet comprising: a first contact belt and a second contact belt used for contacting with the edges of the opposite margins of the laminate sheet; a first energy source and a second energy source used for supplying energy for welding; and a laminate sheet moving means used for moving the laminate sheet along the energy sources, while the edges of the opposite margins of the laminate sheet being welded, characterized in that the lengths of the first contact belt and the second contact belt are less than or equal to 20 mm, preferably 10 mm.

The following part explains this invention in details by way of examples, however this invention is not considered to be limited only to these illustrative examples.

Example

An example of a laminate sheet which can be used for manufacturing a tube with an invisible side seam is shown in the following detail:

OuterLLDPEfilm200/LLDPEextru27.5/Tie10/EVOH15/Tie10/LLDPEextru27.5/InnerLLDPEfilm90

Outer Polyolefin Layer      Barrier Layer      Inner Polyolefin Layer

The laminate sheet is needed to be cut at a predetermined angle of 45° to 60° before going through a tube forming process. A conventional method for the tube forming process without using an additional synthesis film strip is started from forming the sheet into a tube, and directly overlapping of two edges of the plastic film, and transporting it through a welding zone. Welding heat is supplied by means of circulating contact belts over the overlapped surfaces by energy sources. The circulating contact belts have a width between 2 and 40 mm. The overlapped seam of the tube body is welded together by applying heat and pressure and thereafter passing through a cooling zone.

The laminate tube according to this invention is formed from a multi-layered sheet material comprising a body of an outer polyolefin layer, a barrier layer, an inner polyolefin layer, and a discharge opening located at one end of the body. For a relationship between thicknesses, it is preferable that the bather thickness of the tube body is, for example, 7 to 30 microns, and the total thickness of the laminate body is approximately 170 to 450 microns. All layers of the sheet material are firmly adhered to each other.

The tube seam produced in these laminate films is formed by an overlapping method. In the overlapped region, an inner film of one laminate margin is sealed with an outer printed film of the other laminate margin. The outer and inner film materials are made from the same type of plastic, since otherwise it would not be able to form the side seam.

The outer printed film can be a mono- or multi-layered film, such as a coextruded film, a laminated film, etc., and can be printed on the surface/external or internal side. Surface printing is performed via a conventional printing, such as flexography, offset printing, screening, and embossing, while interior printing is gravure printing on a polyester film or a polyethylene film. Polyolefin can be used for making the outer film.

The barrier layer can be made from an aluminium foil, polyamide, polyester, ionomer resins, polyvinyl-based products, copolymers of ethylene and vinyl alcohol, metalized polyolefin, metalized polyester, or cyclic olefin copolymers.

The inner film can be a mono- or multi-layered film, such as a coextruded film, a laminated film, etc. Polyolefin can be used for making the inner film. Thereafter, a multi-layered film or sheet subjected to both external and internal printing is protected via lacquer before the tube forming process. Glossy or matt varnish can be used as the lacquer in this invention.

Figure 1:
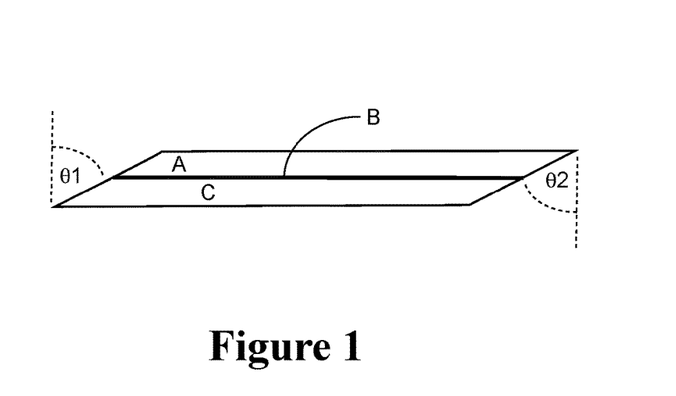
FIG. 1 shows predetermined angles ($\theta 1$, $\theta 2$) of a chisel cut of a laminate sheet comprising: (A) an outer layer; (B) a barrier layer; and (C) an inner layer.

In order to achieve ideal appearance of the side seam together with high seal strength, it is preferable that the edges are cut at a certain angle and welded while being situated obliquely against one another. It is preferable that the laminate margins are cut obliquely at an angle of 30° to 90°, preferably 45° to 60°, with the respect to the plane of the laminate, and welded (FIG. 1). This overlap welding also has an advantage of no extra cost for a plastic film strip.

Figure 2:
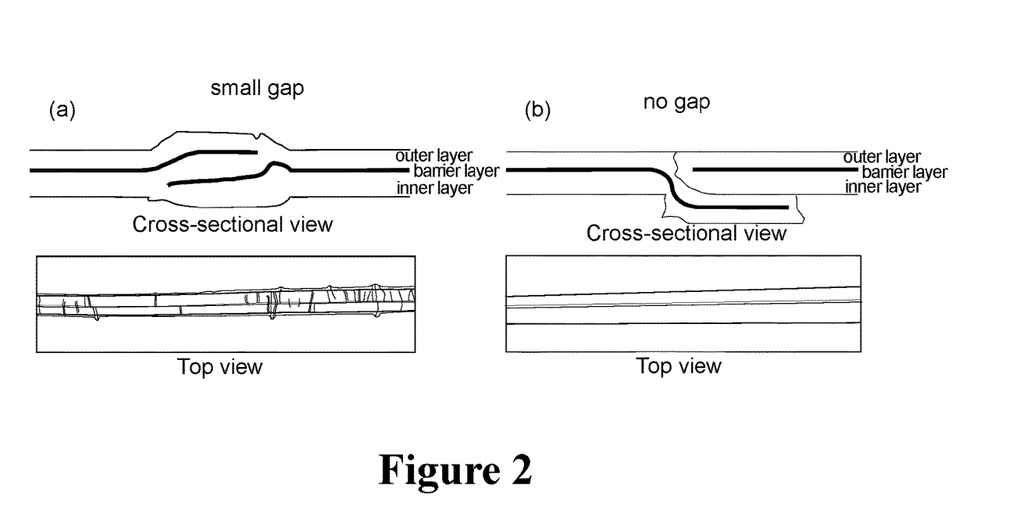
FIG. 2 shows cross-sections at overlapped side seams of laminate tubes made from: (a) a laminate sheet with a conventional side seam, and (b) a laminate sheet with a chisel cut at a predetermined angle of 60° with a modified heat source of 10 mm in length and an increase of cooling air according to this invention.

For the tube forming process, a laminate tube manufacturing machine is conventionally used for forming the overlapped seam by supplying heat under pressure and subsequent cooling the seam area. Another possibility is welding by means of ultrasound, laser, or heat and adhesive methods. A radio frequency (RF) radiation source with independent internal and external heat generators is used. Two high frequency generators permit independent application of energy to the inside and outside of the tube. The resulting seam with unmodified machine accessories is shown in FIG. 2a. As the RF sealing method is the most preferable method for longitudinal sealing of tubes, modified machine parts at the heating and cooling areas are essential for invisible results at the side seam of the tube body according to this invention. The contact surfaces of the circulating contact belts at the first and second heat energy sources should be modified from a conventional length of 15-20 mm to a narrow length of 10 mm. Furthermore, an increase of subsequent cooling at the cooling zone is applied for achieving a smooth surface at the welded area. The pressure applied in the conventional tube forming machine is kept unchanged. A hazy gap at the seam area is reduced in order to be more visible.

FIG. 2b shows the schematic view of the cross section at the overlapped side seam according to this invention. A single line appears in the top view showing a smooth surface. There is no over-thickness at the surface of the side seam, while maintaining aestheticism at the outer surface and withstanding breakage.

Figure 3:
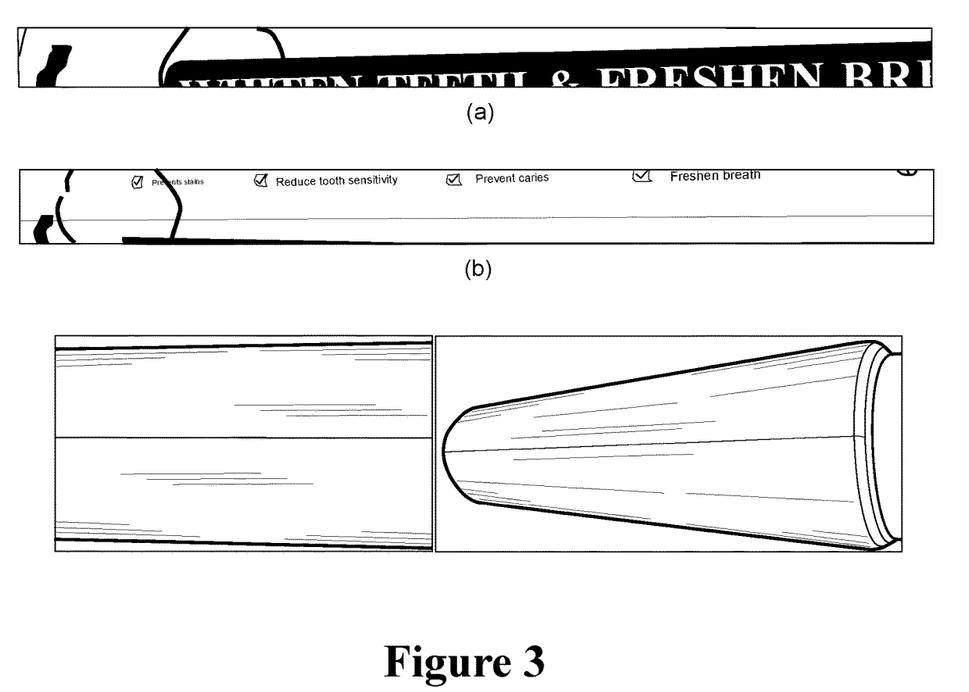
FIG. 3 shows overlapped side seams of laminate tubes having: (a) a chisel cut at 90°, (b) a chisel cut at 30°, and (c) a chisel cut at 45°.

FIG. 3 shows the overlapped side seams of the laminate tubes having various angles of the chisel cuts. There are several possibilities causing defects at the side seam of the laminate tube as shown in FIGS. 3a and 3b. One example is misalignment during a cutting process. Non-uniformed cutting angles or un-sharp blades during a cutting process are also causes of these defects. FIG. 3c is a photograph of the laminate tube according to this invention produced under the chisel cut at 45°, the contact surface of 10 mm in length, and the increase of cooling at the cooling zone. There is no hazy gap at the seam line, and the tube is passed a burst test subjected to 2.0 bars for 30 seconds.

Figure 4:
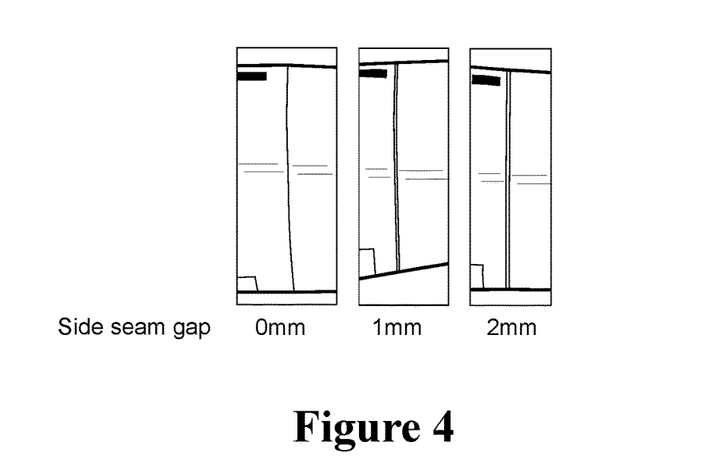
FIG. 4 shows side seams according to this invention having a chisel cut at 60° in three different printing gaps: 0 mm gap, 1 mm gap, and 2 mm gap.

FIG. 4 shows the side seams of the laminate tubes according to this invention with different gaps of the side seams. It is quite difficult to control for a zero gap of the side seam for a long production time. This is because the printing ink is close to the heating source of the tube forming apparatus. The careful monitoring of effectiveness of the tube forming apparatus in order to produce a consistent quality tube is needed.

Figure 5:
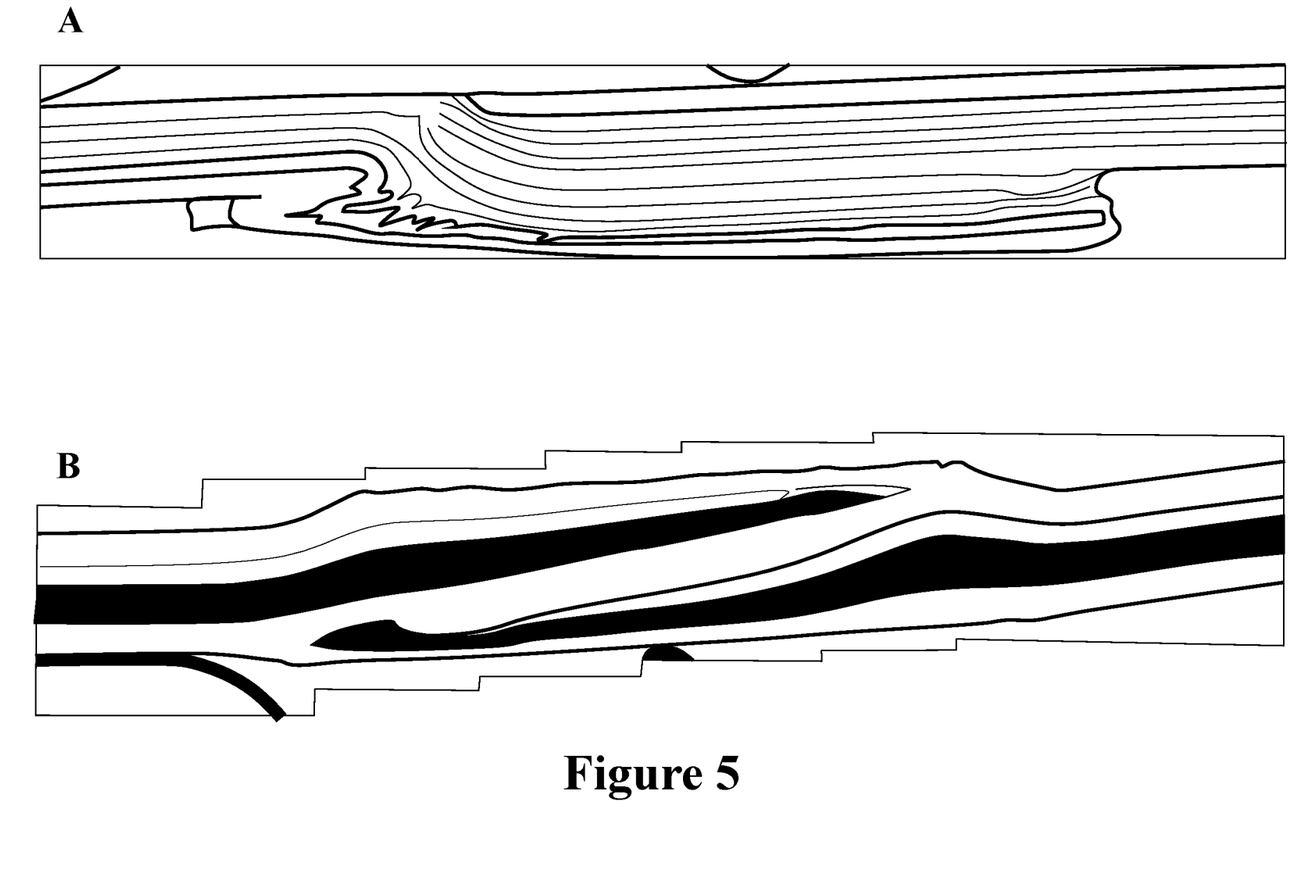
FIG. 5 shows photographs obtained from a microscope showing (A) a side seam according to this invention and comparing it to (B) a side seam of an existing tube.
Figure 6:
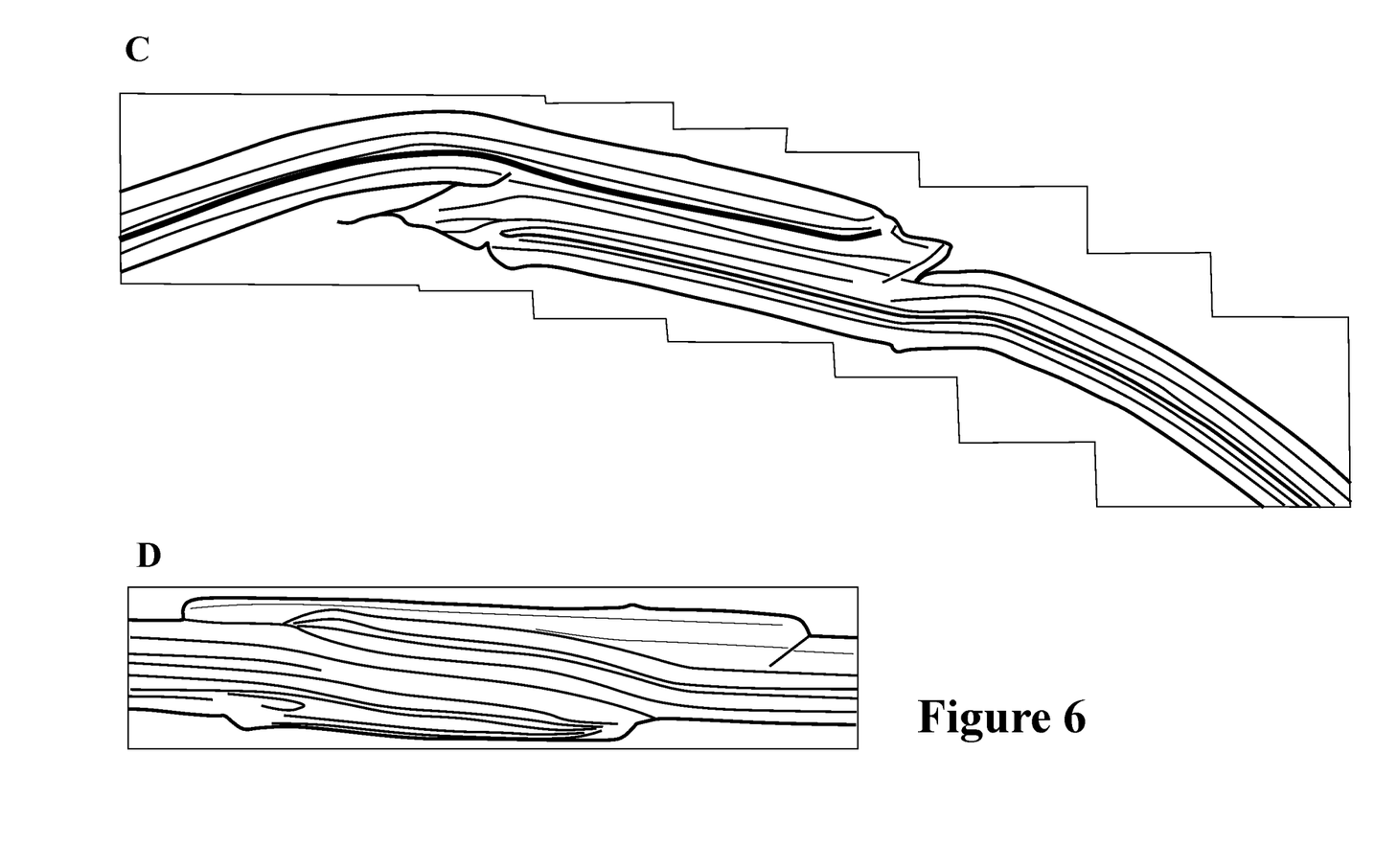
FIG. 6 shows photographs obtained from a microscope showing (C) a side seam of an existing tube and (D) a side seam of an existing tube.

FIG. 5 and FIG. 6 show photographs obtained from a microscope showing: (A) an invisible longitudinal overlapped side seam according to this invention formed by overlap welding an edge of one margin of a laminate sheet comprising an outer plastic layer, a barrier layer, and an inner plastic layer of the same material type as the outer plastic layer to the other edge of the opposite margin of the laminate sheet, wherein there is a hump in an overlapped region on an inner surface of the laminate tube, while there is no said hump on an outer surface of the laminate tube, so that printed matter around the tube looks as if it is joint-less, and the tube surface is smooth as if the tube is an extruded tube; and comparing it to (B) a overlapped side seam of the existing tube having humps on both inner and outer surfaces and a small outer gap, (C) a side seam of the existing tube having humps on both inner and outer surfaces and a small outer gap, and (D) a side seam of the existing tube having humps on both inner and outer surfaces and a small outer gap, affecting aestheticism of the printed matter.

The invention claimed is:

1. A laminate tube with an invisible longitudinal overlapped side seam formed from overlap welding a first edge of one margin of a laminate sheet comprising an outer plastic layer, a barrier layer, and an inner plastic layer of the same material as the outer plastic layer to a second edge of an opposite margin of the laminate sheet, each of the first and second edges being cut obliquely at a predetermined angle of 30° up to, but not including, 90° before welding and the welding being performed in an overlapped region with an outer surface of the outer plastic layer at the second edge directly contacting and overlapping both the obliquely cut first edge and an outer surface of the inner plastic layer at the first edge such that an inner surface of the laminate tube has a hump in the overlapped region, while an outer surface of the laminate tube is smooth without a hump in the overlapped region.

2. The laminate tube according to claim 1, wherein the edges of both margins of the laminate sheet are cut obliquely at a predetermined angle of 45° to 60°, before welding.

3. The laminate tube according to claim 1, wherein the outer plastic layer and the inner plastic layer are a monolayered plastic or multi-layered plastics.

4. The laminate tube according to claim 1, wherein the outer plastic layer and the inner plastic layer have a thickness of 50-300 microns.

5. The laminate tube according to claim 1, wherein the outer plastic layer and the inner plastic layer are selected from the group consisting of polyethylene, copolymers of ethylene and alpha-olefin, polypropylene, polypropylene-based elastomers, copolymers of propylene and alpha-olefin, copolymers of ethylene and propylene, copolymers of ethylene and cyclic acid, and ethylene acid copolymers.

6. The laminate tube according to claim 1, wherein the barrier layer is selected from the group consisting of an aluminum foil, PET (a polyethylene terephtalate film), mPET (a metallized PET film), EVOH (copolymers of ethylene and vinyl alcohol), and PE (polyethylene).

7. The laminate tube according to claim 1, wherein the barrier layer has a thickness of 7-30 microns.

8. The laminate tube according to claim 1, wherein the laminate sheet is a laminate sheet with a matt or glossy printed surface and, when the laminate sheet is subject to welding, the laminate tube with the invisible longitudinal overlapped side seam and a zero gap of the side seam can be obtained.

9. A process of forming a laminate tube with an invisible longitudinal overlapped seam, comprising:

overlap welding a first edge of one margin of a laminate sheet comprising an outer plastic layer, a barrier layer, and an inner plastic layer of the same material as the outer plastic layer to a second edge of an opposite margin of the laminate sheet, each of the first and second edges being cut obliquely at a predetermined angle of 30° up to, but not including, 90° before welding and the welding being performed in an overlapped region with an outer surface of the outer plastic layer at the second edge directly contacting and overlapping both the obliquely cut first edge and an outer surface of the inner plastic layer at the first edge such that an inner surface of the laminate tube has a hump in the overlapped region, while an outer surface of the laminate tube is smooth without a hump in the overlapped region.

\* \* \* \* \*